United States Patent [19]
Yanagihara et al.

[11] Patent Number: 5,543,250
[45] Date of Patent: Aug. 6, 1996

[54] ELECTRODE FOR STORAGE BATTERY AND METHOD FOR PRODUCING THE SAME

[75] Inventors: Nobuyuki Yanagihara, Hirakata; Hiroshi Kawano, Ibaraki; Takayuki Hayashi, Kadoma; Masato Tsuji, Kyoto, all of Japan

[73] Assignee: Matsushita Electric Industrial Co., Ltd., Kadoma, Japan

[21] Appl. No.: 327,838

[22] Filed: Oct. 27, 1994

[30] Foreign Application Priority Data

Oct. 29, 1993 [JP] Japan ..................... 5-271906

[51] Int. Cl.$^6$ ..................... H01M 4/70
[52] U.S. Cl. ............... 429/241; 29/2; 29/623.5; 427/126.3
[58] Field of Search .................. 429/241; 29/2, 29/623.5; 427/126.3, 388.1, 388.4, 376.2

[56] References Cited

U.S. PATENT DOCUMENTS 4,000,005  12/1976  McBreen ................. 429/212
5,053,292  10/1991  Hasebe et al. ............ 424/291

FOREIGN PATENT DOCUMENTS

| 359732 | 4/1906 | France | H01M 4/70 |
|---|---|---|---|
| 429054 | 9/1911 | France | H01M 4/70 |
| 889184 | 1/1944 | France | H01M 4/70 |
| 49-77142 | 7/1974 | Japan . | |
| 58-41975 | 3/1983 | Japan | H01M 4/72 |
| 58-163157 | 9/1983 | Japan | H01M 4/24 |
| 0212318 | 3/1987 | Japan | H01M 4/70 |
| 1302668 | 12/1989 | Japan | H01M 4/74 |
| 6-76826 | 3/1994 | Japan . | |

Primary Examiner—Stephen Kalafut
Attorney, Agent, or Firm—Cushman Darby & Cushman L.L.P.

[57] ABSTRACT

The electrode comprises a metal substrate and a coated layer of an active material provided on one or both faces of the substrate. The metal substrate is a metal sheet having a plurality of punched holes. The punched holes have burrs along their peripheries so that the apparent thickness including the burrs is at least twice the original thickness of the metal sheet. The burrs improve the engagement between the metal substrate and the coated layer.

17 Claims, 5 Drawing Sheets

ELECTRODE FOR STORAGE BATTERY AND METHOD FOR PRODUCING THE SAME

BACKGROUND OF THE INVENTION

1. Field of the Invention

The present invention relates to a storage battery and, more particularly, to an electrode used for an alkaline storage battery and a method for producing the same.

2. Description of the Prior Art

A typical positive electrode of an alkaline storage battery is a nickel electrode. This electrode may be a sintered type electrode or a non-sintered type electrode. In producing the former type of electrode, a microporous sintered plaque obtained by sintering nickel powder is impregnated with an aqueous solution of nickel nitrate or the like thereby to add nickel salt, and, after drying, the sintered plaque is immersed in caustic alkali aqueous solution to convert the nickel salt to nickel hydroxide. This method has the disadvantage that the process is complicated and the filling density of nickel hydroxide as an active material is reduced in comparison with the non-sintered electrode described later. In spite of this disadvantage, this electrode has a highly efficient discharge characteristic and a long cycle life, and finds wide application in a variety of fields.

A non-sintered electrode has previously been of a pocket type. According to a method recently put into practice, on the other hand, nickel hydroxide powder as a powder of active material directly fills a foamed-nickel porous material. This method is a simple method of electrode production. Further, the availability of a foamed nickel porous material of high porosity makes it possible to fill it with nickel hydroxide to a high density and therefore a high-capacity battery can be produced. The foamed nickel porous material, however, needs to be produced by electroplating and therefore has the disadvantage of high material cost.

In view of this, a non-sintered electrode is under development using a low-cost punched metal or expanded metal in place of the foamed nickel porous material as an electrode support. These electrode supports have no three-dimensional structure unlike the sintered plaque or the foamed-nickel porous material. As a result, an electrode made of these electrode supports has a low ability to hold an active material and the active material is liable to fall off during electrode fabrication or repeated charging and discharging. Further, due to the low electronic conductivity in the electrode thickness direction and a poor electrode characteristic, these electrode supports find no practical applications except for special types of electrodes.

The above-mentioned method of electrode production using a punched metal or expanded metal as an electrode support has the advantage that a powder of the active material made into a paste with a solution of a high polymer binder and a conductive powder is coated and dried on the electrode support and thus the electrode can be easily produced. The adhesion between the metal substrate acting as the electrode support and the active material layer is generally weak so that the active material is liable to peel off from the metal substrate in an application using the electrode for batteries. In the case where the electrode support acts as a current collector, the electrical resistance of the electrode increases thereby causing a reduced discharge voltage and discharge capacity. In order to solve this problem, adding a great amount of binder to the active material layer suppresses the separation. The resultant reduced reactivity of the active material, however, has an adverse effect on the discharge characteristic.

In a method for strengthening the adhesion between the metal substrate and the active material layer, a thermoplastic resin layer functioning as a binder is formed on the surface of the metal substrate. Then, the active material is coated on the thermoplastic resin layer and the electrode is heated, to improve the adhesion between the metal substrate and the active material layer. This method, however, has a disadvantage that an insulating layer is formed between the metal substrate and the active material layer with the result that the current collecting characteristic of the electrode is reduced, thereby reducing the reactivity of the electrode.

As described above, these problems are difficult to solve when a comparatively flat metal substrate is used as an electrode support.

SUMMARY OF THE INVENTION

Accordingly, it is an object of the present invention to provide all improvement in a coated-type electrode with an active material layer coated on a metal substrate having a plurality of holes, in order to achieve an improved adhesion and improved electronic conductivity between the active material layer and the metal substrate.

Another object of the present invention is to provide an improved electrode for a storage battery, such as a hydrogen storage alloy electrode using a hydrogen storage alloy powder, a nickel electrode, a zinc electrode or a cadmium electrode.

The present invention provides an electrode for a storage battery, comprising a metal substrate and a coated layer including an active material and provided on at least one face of the metal substrate, wherein the metal substrate is a metal sheet having a plurality of punched holes with punching burrs on at least one face of the metal sheet and along the periphery of each punched hole, and an apparent thickness of the metal sheet including the punching burrs is at least twice as large as the original thickness of the metal sheet.

The present invention also provides an electrode for a storage battery, comprising a metal substrate and a coated layer including an active material and provided on both faces of the metal substrate, wherein the metal substrate is a metal sheet having a plurality of punched holes with punching burrs on both faces of the metal sheet and along the peripheries of the punched holes, and an apparent thickness of the metal sheet including the punching burrs is at least twice the original thickness of the metal sheet.

The present invention also provides an electrode for a storage battery, comprising first and second metal layers, each metal layer having a plurality of punched holes with punching burrs on one face of the metal layer and along the peripheries of the punched holes, wherein an apparent thickness of each metal layer including the punching burrs of the metal layer is at least twice as large as the original thickness of the metal layer; and a filling of an active material being provided between the first and second metal layers with the punching burrs of the first and second metal layers, the punching burrs being embedded in the active material.

Further, the present invention provides a method for producing an electrode for a storage battery, comprising the steps of punching a plurality of holes in a metal sheet so as to produce punching burrs on at least one face of the metal sheet and along the peripheries of the punched holes, and so as to produce an apparent thickness of the metal sheet of at least twice the original thickness of the metal sheet; producing a coated substrate by coating a paste containing an active material on both faces of the metal sheet with the coated substrate having a thickness of one to 1.5 times the apparent thickness; and drying the coated substrate and compressing the coated substrate in the direction of the thickness thereof.

According to a further aspect of the present invention, there is provided a method for producing an electrode for a storage battery, comprising the steps of punching a plurality of holes in a metal sheet so as to produce punching burrs on one face of the metal sheet and along the peripheries of the punched holes, and so as to produce an apparent thickness of the metal sheet of at least twice the original thickness of the metal sheet; producing a coated substrate by coating a paste containing an active material on the one face of the metal sheet with the coated substrate having a thickness of one to 1.5 times the apparent thickness; drying the coated substrate; folding the coated substrate with the coated face being folded inwards; and compressing the coated substrate.

With an electrode of the present invention, in comparison with an electrode which uses a two-dimensional electrode support like a conventionally punched metal substrate, peeling off of the active material layer from the electrode support is suppressed. At the same time, the fact that the metal substrate has a three-dimensional structure improves the electronic conductivity in the direction of the thickness of the electrode. As a result, the utilization of the active material of the electrode is improved for a higher capacity of the electrode, thereby preventing the voltage from dropping with a large current discharge. Further, the cycle life is improved.

The electrode may be configured so that the active electrode material is coated over the burrs on one surface of the metal substrate, and the coated substrate is folded with the coated surface being folded over onto itself. Due to this configuration, battery characteristics equivalent to those for the conventional sintered electrode or the foamed metal electrode are obtained, thereby reducing the electrode cost.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

It will be recognized that some or all of the Figures are schematic representations for purposes of illustration and do not necessarily depict the actual relative sizes or locations of the elements shown.

DESCRIPTION OF THE PREFERRED EMBODIMENTS

In the following paragraphs, embodiments of the electrodes and methods for producing the same in accordance with the present invention will be explained in detail with reference to the attached drawings.

Figure 1:
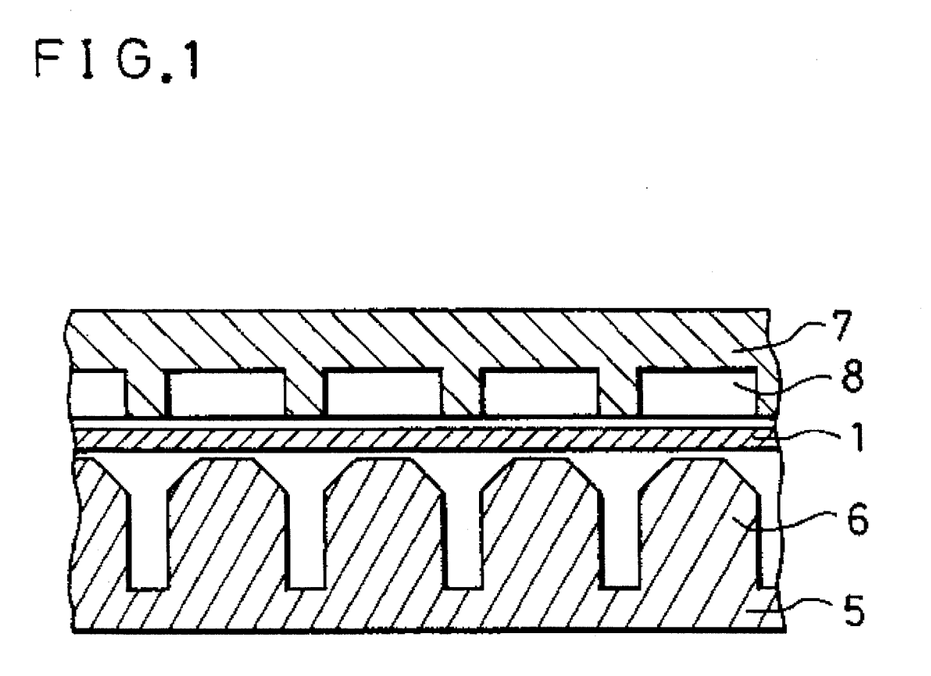
FIG. 1 is a longitudinal sectional view showing an example of a mold for producing a porous metal substrate used in an embodiment of the present invention.

FIG. 1 is a longitudinal sectional view showing a preferred configuration of a mold used for punching holes in a metal sheet. A male mold 5 has a multiplicity of punches 6 each having a forward end of truncated cone shape, and a female mold 7 has recesses 8 at positions corresponding to the punches 6.

Figure 2:
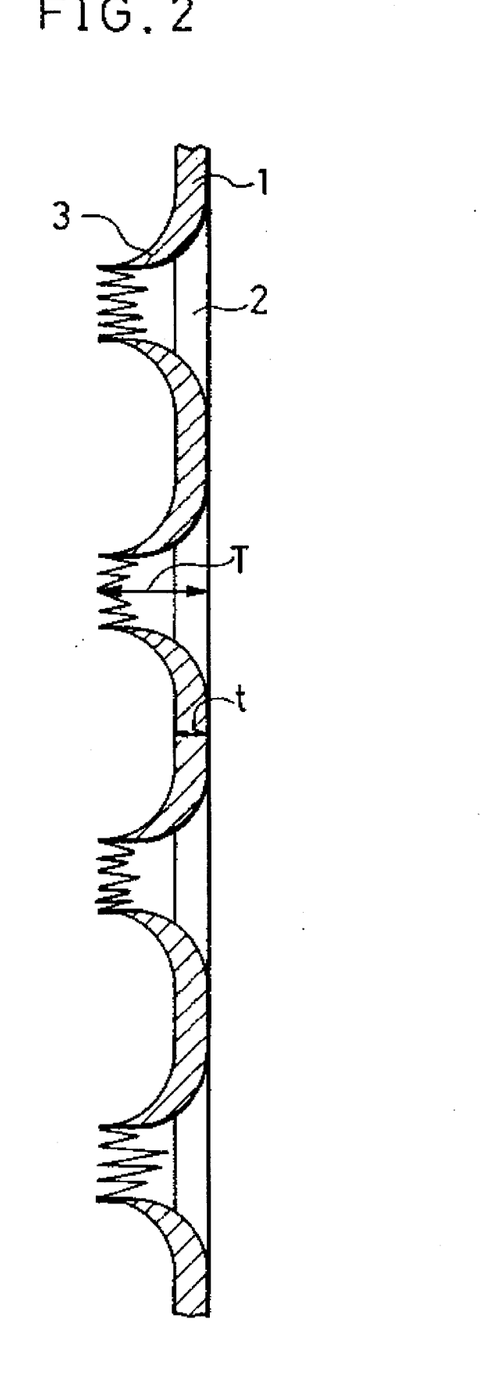
FIG. 2 is a longitudinal sectional view showing a porous metal substrate according to an embodiment of the present invention.

A metal sheet (e.g. a metal plate or a metal foil) 1 is arranged between the male mold 5 and the female mold 7. When the male and female molds are pushed together, the metal sheet 1 is pressed into the recesses 8 of the female mold 7 by means of the forward ends of the punches 6 of the male mold 5. As shown in FIG. 2, the metal sheet 1 is thus perforated to produce holes 2 while the metal adjacent to the holes is bent out of the original plane of the sheet 1 to form burrs 3, providing each hole with a ragged edge extending away from a respective face of the sheet, as shown. The holes 2 are punched, and burrs 3 are formed, by the male mold 6 pushing on the metal sheet 1 during the punching operation. The metal sheet 1 having a thickness of t acquires an apparent thickness T including the burrs.

Figure 3:
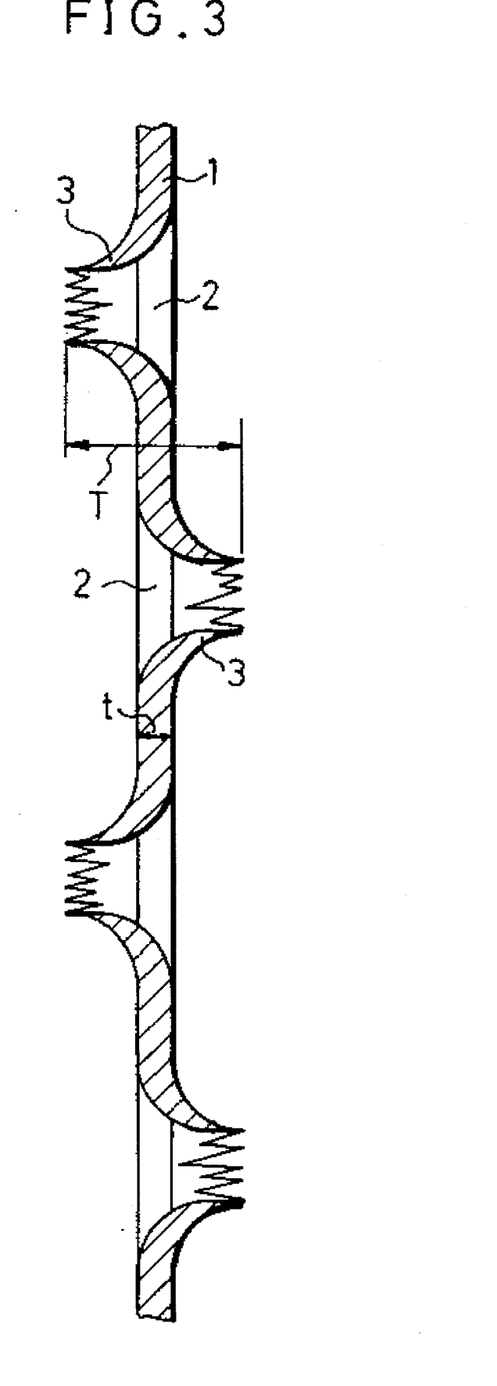
FIG. 3 is a longitudinal sectional view showing a porous metal substrate according to another embodiment of the present invention.

FIG. 3 shows a metal substrate, in which a metal sheet 1 is punched by use of a male mold wherein every other punch 6 is removed from the mold shown in FIG. 1. Then, the metal sheet 1 is turned over and is moved so that the punched holes are displaced longitudinally by one half pitch and laterally by one half pitch. Thereafter, punching is carried out again using the same mold. This punching operation from the two sides produces burrs 3 on both faces of the metal sheet 1. In the case that burrs are formed on both faces of a metal sheet, adjacent holes are preferably punched in opposite directions, so that burrs are formed on opposite faces, thereby producing a metal sheet 1 with sufficient apparent thickness T.

The metal sheet may have a thickness t of from 25 μm to 100 μm, and the size of the punched holes may be from 0.2 mm to 2 mm in diameter for circular holes, and from 0.2 mm to 2 mm in the length of each side for holes which are rectangles or similar polygons.

The metal sheet is made of or covered with a metal which is electrolyte-resistant.

Figure 4:
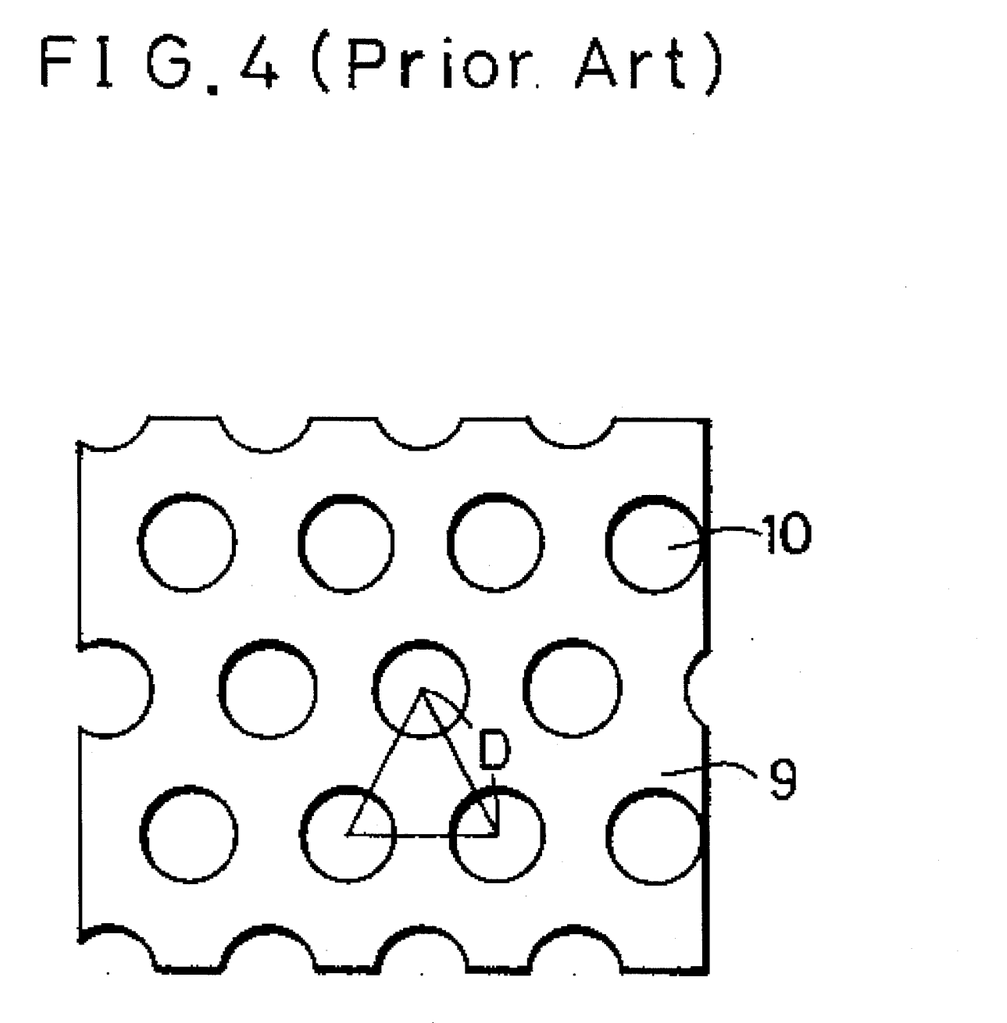
FIG. 4 is a top plan view of a conventional punched metal substrate.

A conventional flat punched metal for a comparative example is shown in FIG. 4. For example, a nickel sheet 9 having a thickness of 50 μm is punched with holes 2 mm in diameter at a center-to-center pitch (D) of 3.5 mm. The punches of the mold do not have forward ends which are truncated cones. Instead, the metal sheet is cut or sheared by means of the edges of the punches of the male mold and the edges of the recesses of the female mold. The holes thus punched are formed with very few burrs, if any, along the peripheries thereof.

In the following paragraphs, examples of the present invention will be described together with comparative examples by referring to the attached drawings.

EXAMPLE 1

Nickel sheets having a thickness of 50 μm were punched in accordance with the specification shown in Table 1 thereby to produce metal substrates. The holes are arranged in a grid with inter-hole pitches of 3.5 mm.

TABLE 1

| Porous metal substrates | Type of punching | Apparent thickness (μm) | Shape of punched hole | Remarks |
|---|---|---|---|---|
| a | One side | 75 | Generally rectangular each side having a length of 2 mm | |
| b | | 100 | | |
| c | | 150 | | |
| d | | | Circle of 2 mm in diameter | |
| e | Both sides | 80 | Generally rectangular each side having a length of 2 mm | Burrs of adjacent holes project in opposite directions |
| f | | 100 | | |
| g | | 200 | | |
| h | | | Circle of 2 mm in diameter | |
| i | | | Same as for samples e–g | Disordered* |
| j | | | Punched metal as shown in FIG. 4 | |

*"Disordered" means that the punching burrs on both sides of the metal sheet point in the two different directions in a random manner.

These metal substrates were used to prepare paste-type nickel electrodes. Cylindrical sealed nickel-cadmium storage batteries (C size) were thus constructed.

First, 100 g of nickel hydroxide powder were mixed into a paste form with 10 g of graphite powder, 5 g of nickel powder, 10 g of cobalt powder, 55 g of 3 wt % aqueous solution of carboxymethylcellulose and 5 g of 48 wt% styrene-butadiene rubber aqueous dispersion. Each metal substrate shown in Table 1 was passed through a bath containing this paste to coat the paste on both faces of the metal substrate. The coated metal substrate assembly was then passed through a stainless-steel slit to reduce the paste coated substrate to a predetermined thickness. Then the substrate was dried and compressed to prepare a coated-nickel positive electrode having a thickness of from 0.63 mm to 0.65 mm.

Next, these nickel electrodes were cut into rectangles (i.e., 38 mm×220 mm). The theoretical capacity calculated from the amount of nickel hydroxide contained in the electrode thus obtained is in the range of from 2610 mAh to 2692 mAh.

Each of these nickel positive electrodes was combined with a well-known cadmium negative electrode and a separator made of unwoven fabric of polyamide resin to configure a cylindrical sealed battery having a nominal capacity of 2.4 Ah. An aqueous solution of potassium hydroxide (31 wt) dissolved with lithium hydroxide 30 g/1 was used in an amount of 6 ml. per cell as the electrolyte. Batteries A to J using the nickel positive electrodes obtained respectively from the metal substrates "a" to "j" shown in Table 1 were thus prepared.

The batteries constructed as described above were charged for 15 hours at 0.1 C (10-hour rate), and then left for one hour and thereafter discharged at 0.2 C (5-hour rate) until the battery voltage decreased to 1.0 V. Three cycles of this test were repeated under the same conditions. Next, under similar charging conditions, the fourth-cycle test was conducted with a discharge current of 0.5 C (2-hour rate), and the fifth-cycle test was conducted with a discharge current of 1 C (1-hour rate), to compare the discharge characteristics. Also, for the sixth and subsequent cycles, the cycle life test was conducted by charging at 0.3 C for four hours and discharging at 0.5 C until the battery voltage decreased to 1 V to compare the structure of the nickel positive electrode and the cycle life characteristics. The results are shown in Table 2.

TABLE 2

| Battery | Theoretical capacity of positive electrode (mAh) | Utilization at 3rd cycle (%) | Capacity ratio of 4th to 3rd cycle (%) | Capacity ratio of 5th to 3rd cycle (%) | Discharge capacity at 100th cycle (mAh) | Discharge capacity at 200th cycle (mAh) |
|---|---|---|---|---|---|---|
| A | 2631 | 91.1 | 76.2 | 61.2 | 1843 | 1177 |
| B | 2648 | 93.8 | 92.1 | 80.3 | 2319 | 1995 |
| C | 2684 | 95.8 | 95.4 | 89.8 | 2543 | 2388 |
| D | 2612 | 96.1 | 96.1 | 90.1 | 2487 | 2399 |
| E | 2669 | 91.8 | 79.3 | 68.0 | 1952 | 1370 |
| F | 2683 | 96.8 | 93.7 | 90.1 | 2394 | 2081 |
| G | 2692 | 99.9 | 99.1 | 93.2 | 2610 | 2493 |
| H | 2610 | 99.4 | 99.3 | 92.9 | 2575 | 2471 |
| I | 2650 | 98.8 | 99.4 | 93.0 | 2594 | 2491 |
| J | 2637 | 87.8 | 74.3 | 58.4 | 1013 | 242 |

There was no conspicuous difference between the storage batteries in the utilization of the nickel hydroxide used for the nickel electrode. It is seen, however, that the utilization is lowest for the battery J using the conventional flat punched metal as an electrode support. The utilization means the ratio of the actual capacity to the theoretical capacity. The batteries B to D and F to I in accordance with the embodiments of the present invention, on the other hand, are seen to exhibit superior characteristics. Also, a great difference was observed in the high-rate discharge characteristics, especially in the discharge capacity at 1C discharge of the fifth cycle.

This has the following explanation. In the case in accordance with the present invention wherein a metal sheet is processed into a metal substrate with a three-dimensional structure having burrs along the periphery of the holes and the apparent thickness of the substrate including the burrs is increased to at least twice that of the original metal sheet, the electronic conductivity in the direction of the thickness is adequate and the capacity drop caused by a large-current discharge is reduced.

With regard to the batteries A and E using a metal substrate having an apparent thickness less than twice that of the unprocessed metal sheet, by contrast, the high-rate discharge characteristic is not as good as for batteries B to D and F to I. This indicates that the characteristic improvement is minor for an apparent thickness of less than twice that of the unprocessed metal sheet. Further, the result of a cycle life test shows that the electrode in accordance with the present invention is superior. The comparative example (the battery J) considerably decreased in discharge capacity. A post-test disassembly of the battery revealed that the active material layer of the electrode was separated from the metal substrate and this separation was a main cause of the decrease in discharge capacity.

It can be said from the above-mentioned result that in the case where a metal sheet punched with holes and formed intentionally with burrs is used as an electrode support making up a nickel electrode for a storage battery, the electronic conductivity of the electrode is improved while at the same time suppressing separation of the active material layer. A battery structure having a superior discharge characteristic and cycle life characteristic can thus be obtained. Although the holes punched from one side of the metal sheet are effective to some degree, punching holes from both sides is more advantageous from the viewpoint of battery characteristics since the metal substrate is situated at the center of the electrode. In the case where the punched holes are small, the apparent thickness of the substrate increases by only a small amount in comparison with the original metal sheet, and therefore the effect of the present invention is small. When the hole size is increased, by contrast, the pitch between adjacent holes has to be increased, thereby resulting in a smaller contribution to an improved electronic conductivity while at the same time reducing the grip on the active material of the electrode. It was found that the effect of the present invention is greatest with circular holes having a diameter of 0.2 to 2 mm and rectangular or similar holes having the length of each side in the range of 0.2 to 2 mm.

As described above, with the present invention, in comparison with flat punched metal used as an electrode support of a nickel electrode for a storage battery, the battery characteristic is improved. Further, the electrode according to the present invention can be produced at lower cost than those electrodes with a three-dimensionally foamed porous nickel substrate or fabric-type nickel processed into felt. The electrode cost can thus be reduced. Furthermore, the present invention is obviously applicable not only to the nickel electrode for a storage battery described above with reference to the embodiments but also to other similar electrodes for a storage battery including a zinc electrode, a cadmium electrode and a hydrogen storage electrode made of a hydrogen storage alloy powder.

EXAMPLE 2

Using a method similar to that in Example 1, a metal sheet was punched so as to form holes with burrs from both sides to prepare a metal substrate having a plurality of punched holes with punching burrs on both faces thereof along the peripheries of the punched holes. The adjacent holes of the resultant metal substrate had the burrs on opposite faces. A paste similar to that used in Example 1 was coated on this metal substrate. The substrate was then dried and compressed to produce a coated nickel positive electrode. Slit widths of 1.0, 1.25, 1.5, 1.75 and 2.0 times as large as the apparent thickness of the metal substrate were used for adjusting the thickness after coating on of the paste.

A cylindrical sealed battery was fabricated as in Example 1 using each electrode obtained as mentioned above, and the battery characteristics were compared in similar fashion. As a result, the range of slit widths in which the technical advantage of the present invention is conspicuously observed was found to be 1 to 1.5 times the apparent thickness of the metal substrate. For the slit width larger than 1.5 times the apparent thickness of the metal substrate, a sufficient electronic conductivity was difficult to secure in the direction of the thickness, resulting in a great decrease in the battery characteristics. An appropriate apparent thickness of the metal substrate can thus be calculated from the slit width.

EXAMPLE 3

Figure 5:
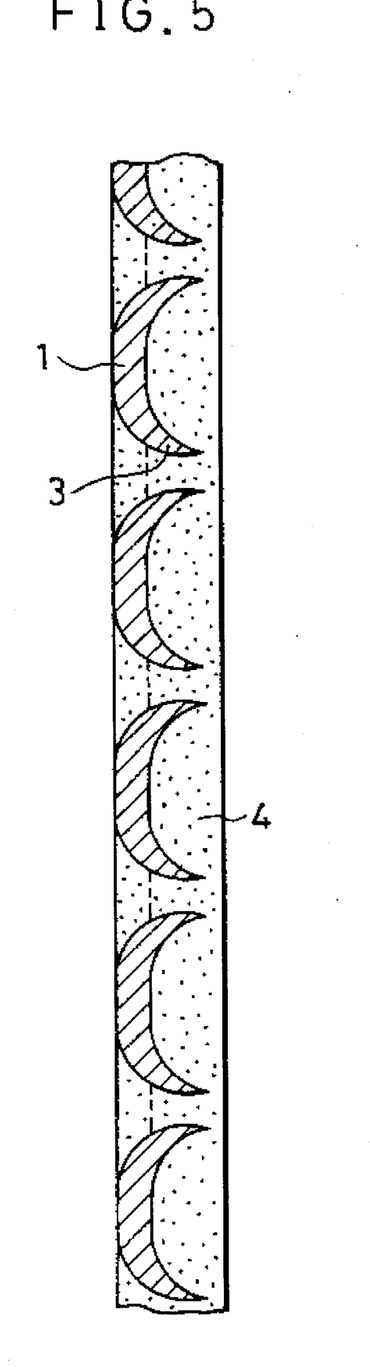
FIG. 5 is a longitudinal sectional view of an electrode according to an embodiment of the present invention.
Figure 6:
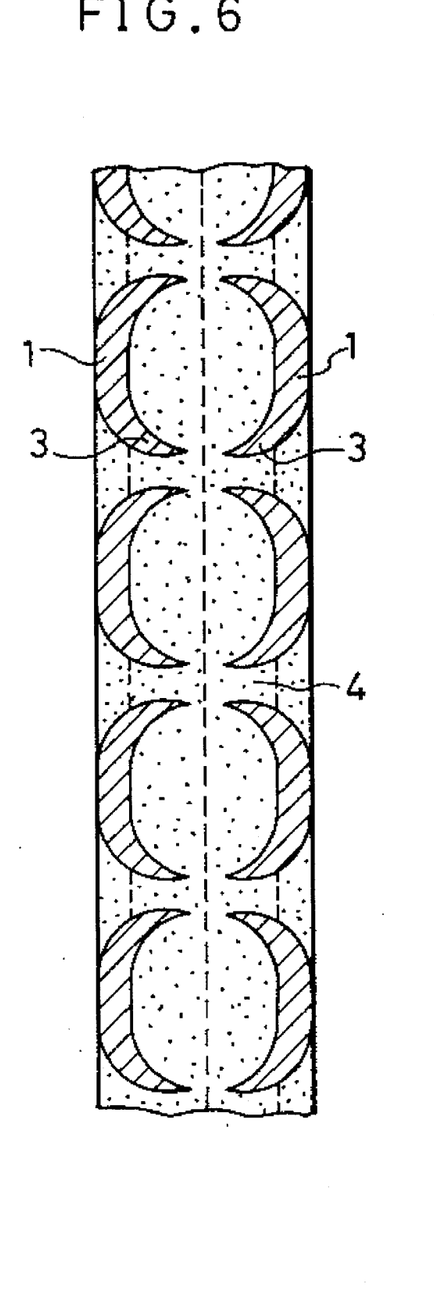
FIG. 6 is a longitudinal sectional view of an electrode according to another embodiment of the present invention.

A method similar to that in Example 1 was used to punch holes from one side of a nickel sheet having a thickness of 50 μm, thus preparing a metal substrate intentionally formed with burrs to provide an apparent thickness of 150 μm. In this way, a coated nickel positive electrode was obtained. In the process, an active electrode material was formed selectively on the surface formed with burrs. The resultant electrode is shown in the sectional view of FIG. 5. As shown in FIG. 6, this electrode was folded with the active electrode material layer 4 inside, and compressed to produce an electrode in such a form as if two electrode plates are overlaid one on the other. A rectangular battery having a capacity of 100 Ah shown in FIG. 7 was constructed using this electrode and a well-known cadmium electrode. The separator and the electrolyte were prepared using the same material as in Example 1.

Figure 7:
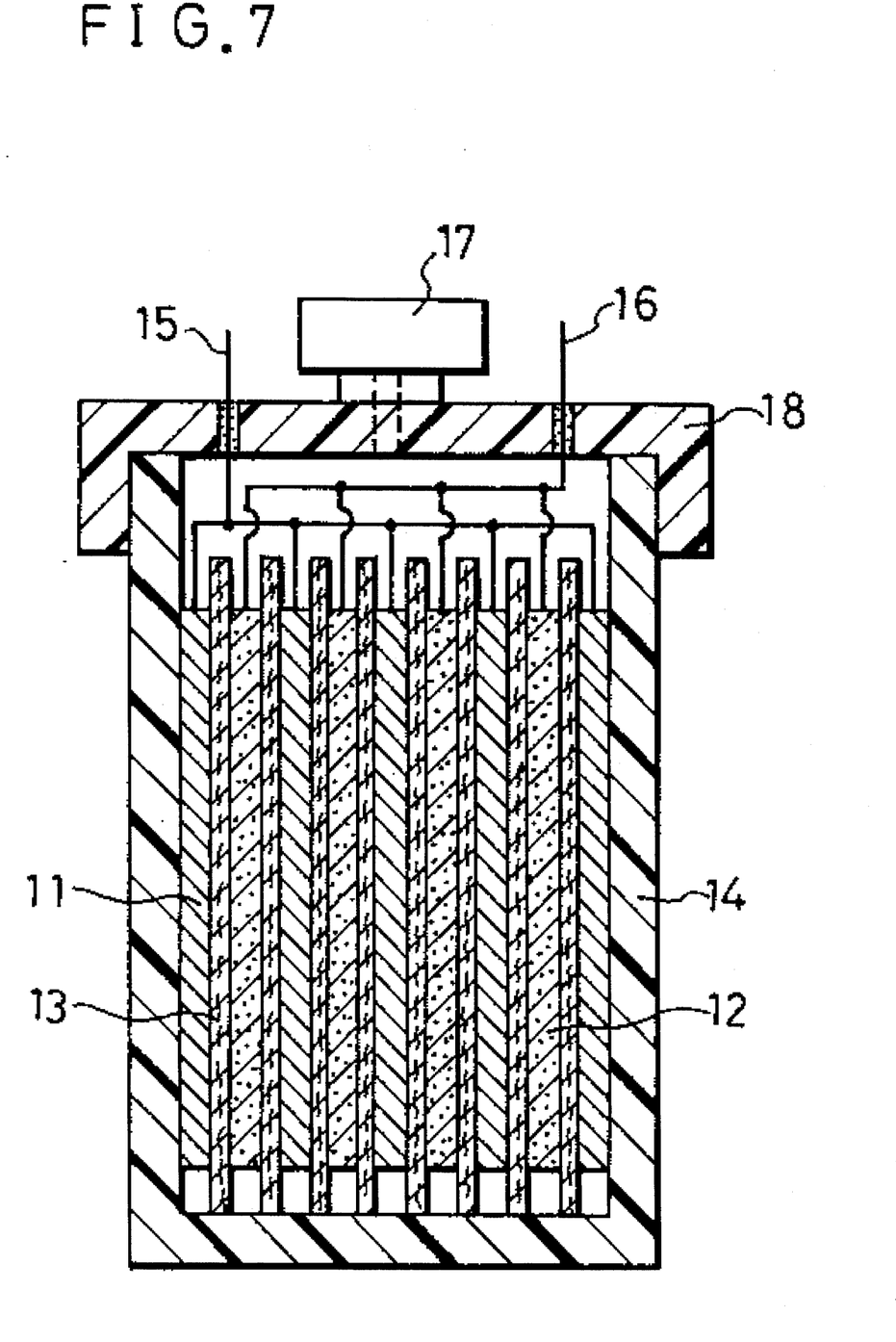
FIG. 7 is a longitudinal sectional view schematically showing a storage battery according to an embodiment of the present invention.

In FIG. 7, numeral 11 designates the cadmium negative electrode, numeral 12 the nickel positive electrode, numeral 13 a separator, numeral 14 a battery casing, numeral 15 a negative terminal, numeral 16 a positive terminal, numeral 17 a safety vent, and numeral 18 the lid of the battery casing.

For the purpose of comparison, two similar batteries were constructed using as the nickel positive electrode a sintered nickel electrode and a nickel electrode with a foamed nickel porous substrate filled with an active electrode material. The characteristics of these batteries were compared. The three types of battery exhibited similar battery characteristics without any difference in performance. Thus the present invention may be used to manufacture a battery of equivalent quality to the conventional batteries but at a lower cost.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrode for an alkaline storage battery, comprising:

a metal substrate of alkali-resistant metal having two opposite faces; and a coated layer including an active material and provided on at least one face of said metal substrate;

said metal substrate being a metal sheet having a plurality of holes punched therethrough so as to have ragged-edge punching burrs extending from at least one face of said metal sheet, along the periphery of each punched hole;

the thickness of said metal sheet including said punching burrs is at least twice as large as the thickness of said metal sheet excluding said punching burrs, said thickness of said metal sheet excluding said punching burrs being in the range of from 25 µm to 100 µm.

2. An electrode for an alkaline storage battery in accordance with claim 1, wherein said punched holes are circular and each punched hole has a diameter in a range of from 0.2 mm to 2 mm.

3. An electrode for an alkaline storage battery in accordance with claim 1, wherein said punched holes are rectangular and each side of each punched hole has a length in a range of from 0.2 mm to 2 mm.

4. An electrode for an alkaline storage battery, comprising a metal substrate of alkali-resistant metal having two opposite face; and a coated layer including an active material and provided on both faces of said metal substrate said metal substrate being a metal sheet having a plurality of holes punched therethrough so as to have ragged edge punching burrs extending from both faces of said metal sheet, along the peripheries of said punched holes;

the thickness of said metal sheet including said punching burrs being least twice the thickness of said metal sheet excluding said punching burrs, said thickness of said metal sheet excluding said punching burrs being in the range of from 25 µm to 100 µm.

5. An electrode for an alkaline storage battery in accordance with claim 4, wherein adjacent punched holes of said metal sheet have punching burrs on opposite faces of said metal sheet.

6. An electrode for an alkaline storage battery in accordance with claim 4, wherein said punched holes are circular and each punched hole has a diameter of from 0.2 mm to 2 mm.

7. An electrode for an alkaline storage battery in accordance with claim 4, wherein said punched holes are rectangular and each side of each punched hole has a length of from 0.2 mm to 2 mm.

8. An electrode for an alkaline storage battery, comprising:

first and second metal layers of alkali-resistant metal each having two faces, each metal layer having a plurality of holes punched therethrough so as to have ragged edge punching burrs extending from at least one said face of each said metal layer, along the peripheries of said punched holes;

the thickness of each metal layer including respective said punching burrs through the respective said metal layer being at least twice as large as the thickness of the respective said metal layer excluding the respective said punching burrs, each said layer having a thickness, excluding the respective said punching burrs in the range of from 25 µm to 100 µm; and a filling of an active material provided between said first and second metal layers, so as to embed respective of said punching burrs in said active material.

9. An electrode for an alkaline storage battery in accordance with claim 8, wherein said first and second metal layers comprise a folded metal sheet, and said filling comprises a double thickness of a coated layer of said active material provided on the inwardly facing face of said folded metal sheet.

10. An electrode for an alkaline storage battery in accordance with claim 9, wherein said punched holes are circular and each punched hole has a diameter in a range of from 0.2 mm to 2 mm.

11. An electrode for an alkaline storage battery in accordance with claim 9, wherein said punched holes are rectangular and each side of each punched hole has a length in a range of from 0.2 mm to 2 mm.

12. A method for producing an electrode for an alkaline storage battery, comprising the steps of:

punching a plurality of holes in a metal sheet of alkali-resistant metal which is from 25 µm to 100 µm thick, so as to produce a plurality of ranged edge punching burrs extending from at least one face of said metal sheet, along the peripheries of said punched holes, and so as to provide said metal sheet with a thickness, including said punching burrs, which is at least twice the thickness of said metal sheet excluding said punching burrs;

producing a coated substrate by coating a paste containing an active material on both faces of said metal sheet, said coated substrate having a thickness of one to 1.5 times said thickness including said punching burrs; and drying said coated substrate and compressing said coated substrate in the direction of the thickness thereof.

13. A method in accordance with claim 12, wherein said punched holes are circular and each punched hole has a diameter in a range of from 0.2 mm to 2 mm.

14. A method in accordance with claim 12, wherein said punched holes are rectangular and each side of each punched hole has a length in a range of from 0.2 mm to 2 mm.

15. A method for producing an electrode for an alkaline storage battery, comprising the steps of:

punching a plurality of holes in a metal sheet of alkali-resistant metal which is from 25 µm to 100 µm thick so as to produce a plurality of ragged edges punching burrs extending from one face of said metal sheet, along the peripheries of said punched holes, and so as to provide said metal sheet with a thickness, including said punching burrs, which is at least twice the thickness of said metal sheet excluding said punching burrs;

producing a coated substrate by coating a paste containing an active material on said one face of said metal sheet, said coated substrate having a thickness of one to 1.5 times said thickness including said punching burrs;

drying said coated substrate;

folding said coated substrate with said coated face being folded inwards; and compressing said coated substrate.

16. A method in accordance with claim 15, wherein said punched holes are circular and each punched hole has a diameter in a range of from 0.2 mm to 2 mm.

17. A method in accordance with claim 15, wherein said punched holes are rectangular and each side of each punched hole has a length in a range of from 0.2 mm to 2 mm.

* * * * *